INVENTORS
GÜNTER HAHLGANSS
GERHARD F. LINDNER
BY
ATTORNEY.

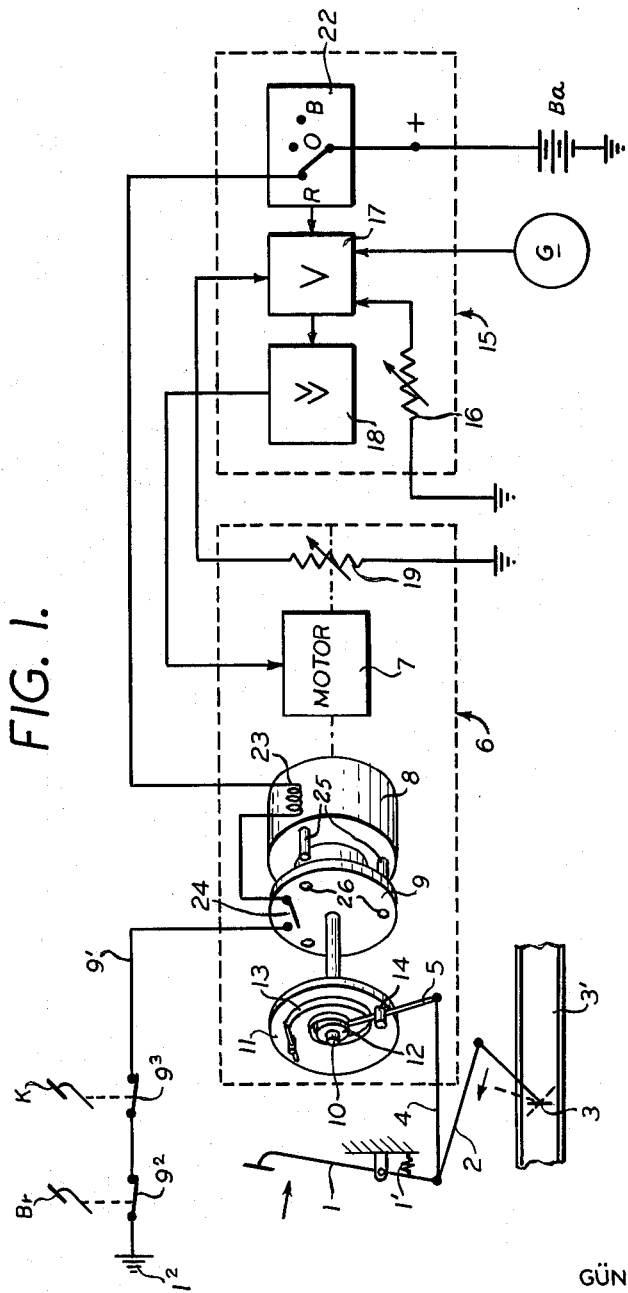

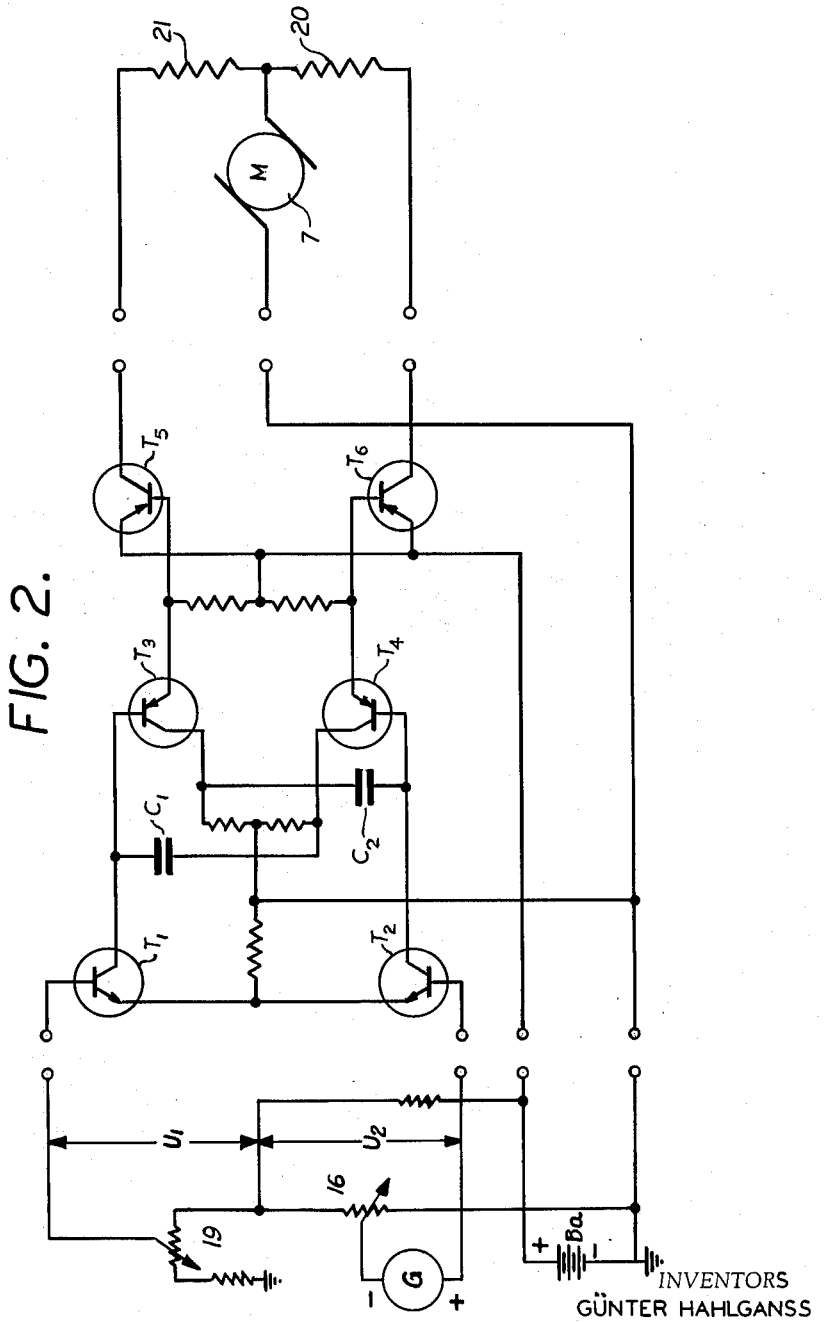

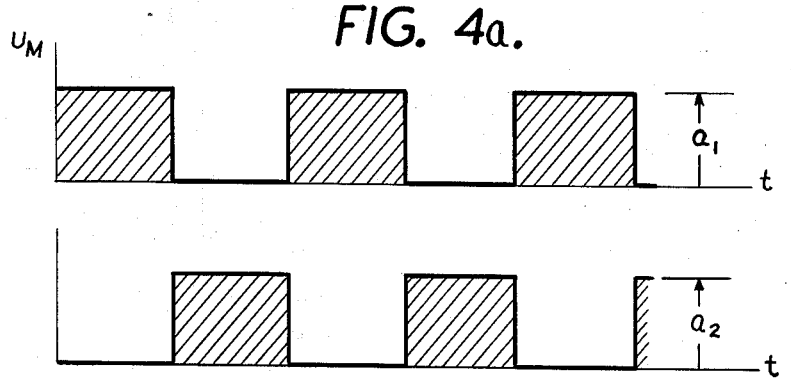
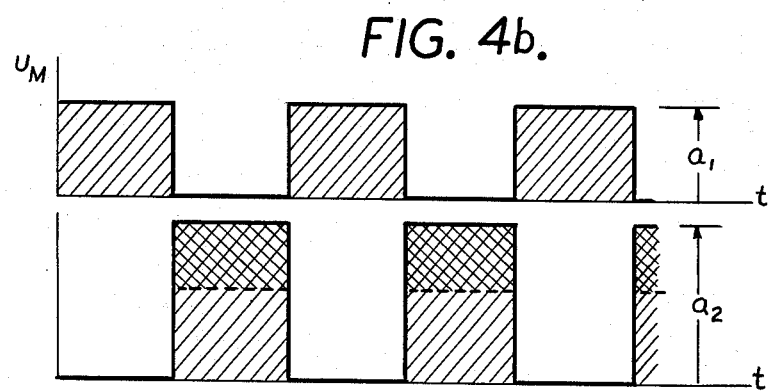
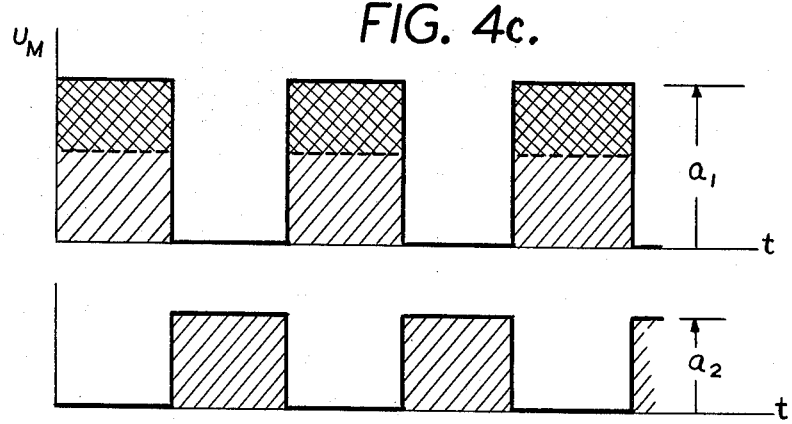

United States Patent Office 3,207,255
Patented Sept. 21, 1965

3,207,255
METHOD OF AND APPARATUS FOR LIMITING AND CONTROLLING THE TRAVELING SPEED OF AUTOMOTIVE VEHICLES
Gunter Hahlganss, Frankfurt am Main-Unterliederbach, and Gerhard F. Lindner, Oberursel, Taunus, Germany, assignors to VDO Tachometer Werke Adolf Schindling G.m.b.H., Frankfurt am Main, Germany, a corporation of Germany
Filed Jan. 21, 1964, Ser. No. 339,256
7 Claims. (Cl. 180—82.1)

The present invention relates to a method of and apparatus for controlling and limiting the traveling speed of automotive vehicles.

In particular, the present invention relates to an apparatus for controlling and limiting the traveling speed of automotive vehicles by means of a control-motor effecting the position of the gas pedal or of the throttle and relates also to a method of, as well as to an apparatus for the control of the control motor in both directions of rotation in dependency upon the prevailing actual speed of the vehicle and a settable predetermined speed.

In such control apparatus, the actual speed is given as voltage by means of a generator driven from the vehicle movement, transformed into a direct current voltage and compared in a reference circuit with an adjustable voltage proportional to the desired adjustable predetermined speed. The reference voltage obtained thereby is used either for switching of the current feed or upon amplification also directly for the feeding of the control motor, which depending upon whether the plus or minus sign of the voltage controls the gas pedal or throttle position in one or the other direction until the vehicle has reached the predetermined speed. As control motors mostly direct current motors are used preferably series-wound motors with two field windings for the two directions of rotation.

The known controls of the control motor in dependency upon the reference voltage obtained from a reference circuit are quite cumbersome and have, first of all, the drawback of a more or less wide dead zone about the zero point of the control, that means, about the point of coincidence of the actual speed and the predetermined speed. If the reference voltage is used for a relay operation, it must reach the response value of the relay. Since, however, the relay cannot be overloaded in case of higher voltages, it must be designed correspondingly for nonsensitivity, also in view of the vibrations in the automotive vehicle. A dead zone about the control zero point is thus unavoidable in the operation. Aside from this fact, relay operations in the automotive vehicle have always the drawback of the sensitivity to vibrations. They are bound to lead to disturbances and cause in addition unesirable noises. A switch control of the control motor has furthermore the drawback, that the motor starts always with full current. This leads very easily to an overcontrol and an oscillation of the control about the predetermined value or causes the requirement of particularly cumbersome braking devices. A proportional control is not possible.

If the reference voltage obtained from the comparison voltages is to be used directly for the feeding of the control motor, a multiple amplification is required. Due to the very small voltage about the predetermined value, a dead zone of the control cannot be avoided, nevertheless, since otherwise the amplifier requirement, which is very high already, reaches non-permissible dimensions.

It is therefore, one object of the present invention to provide a method of and apparatus for controlling and limiting the traveling speed of automotive vehicles, which avoids the drawbacks of the known control devices and brings about, first of all, a very sensitive and exact control of the predetermined value of the speed, practically without a dead zone.

It is another object of the present invention to provide a method of and apparatus for controlling and limiting the traveling speed of automotive vehicles, wherein the control-motor is fed in both directions of rotation by impulse-like currents, wherein the impulse value (duration and/or amplitude) is of a different magnitude in case of a difference betwen the actual speed and the predetermined speed of the vehicle and the value difference of the impulses is changeable in the same sense upon a change of the speed difference. A multi-vibrator is used for the production and speed-responsive control of the impulse-like feeding currents, which multi-vibrator is controlled by the reference voltages proportional to the actual and the predetermined speeds of the vehicle. The inventive multi-vibrator circuit, preferably equipped with transistors, is further designed in such manner, that instead of the conventional resistors in the RC-circuits of the multi-vibrators, the collector-emitter-branch of always one transistor is operated and these transistors are controlled by the reference voltages, so that in case of voltage equality as symmetrical and upon one-equality an asymmetrical switching of the multi-vibrator at the ratio of the reference voltages is brought about. Since the current impulses for the feeding of the control motor delivered from the multi-vibrator circuit do not suffice, they are used for the control of power transistors, which switch impulse-like the feeding currents for the control motor in the same switching ratio.

It is still another object of the present invention to provide a method of and apparatus for the controlling and limiting the traveling speed of automotive vehicles, wherein a very exact control of the actual speed of the vehicle to the set predetermined speed value is obtained due to the impulse form of the feeding currents and by the symmetrical arrangement of the cicuit for its production and control. Since, on the one hand, the multi-vibrator oscillates at a relatively high frequency, on the other hand, due to the impulse form of the feeding current, even at the smallest deviation of the actual speed from the predetermined speed the larger current impulse becomes effective fully, even for a very short time period, a dead zone is practically not present. The control motor can rotate very slowly following the current impulses. The control power requirement is very low compared with a relay circuit. The total expenditure for the control of the control motor is also relatively low with a very small space requirement.

With these and other objects in view, which will become apparent in the following detailed description, the present invention will be clearly understood in connection with the accompanying drawings, in which:

FIGURE 1 is a diagram showing the principal arrangement of a control apparatus;

FIG. 2 is a circuit diagram of the multi-vibrator;

FIGS. 4a, 4b and 4c are schematic showings of the voltages of the impulse-like currents with varying voltage amplitudes at different positions.

Figure 3A:
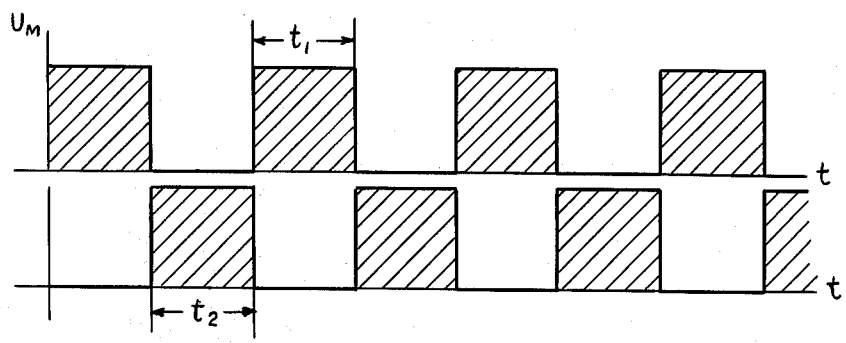
FIGS. 3a, 3b and 3c are schematic showings of the impulse voltages of the feedings currents for the control motor at different positions.

Referring now to the drawings, and in particular to FIG. 1, a gas pedal 1 of the automotive vehicle is disclosed schematically, which gas pedal 1 operates by means of a rod 2 a throttle 3 disposed in the gas feeding conduit 3'. For the automatic speed control, the gas pedal rod 2 is connected by means of a control rod 4 with a control setting lever 5 of a control device 6 of the control apparatus. A control motor 7 with a reduction gear (not shown) and a clutch consisting of the members 8 and 9 is operatively connected with the control lever 5 in the control device 6. In the embodiment shown in FIG. 1, a conventional electro-magnetically operating clutch, preferably used for this purpose, is disclosed. The clutch comprises a magnet body 8 having a magnet coil 23, which magnet body 8 is keyed to the shaft of the control motor 7, and an anchor disc 9 rotatably mounted on the coupling shaft 10. Another disc 11 is rigidly connected with the anchor disc 9 by means of the coupling shaft 9, on which disc 11 the control lever 5 is swingably coaxially mounted by means of a sleeve-like projection 12 and an intermediate pretensioned spring 13. The lever 5 is urged to engagement with an abutment 14 projecting from the disc 11 by the action of the spring 13. The clutch member 9 has an electric conduit $9^1$ which is grounded at $1^2$ and includes switches $9^2$ and $9^3$ disposed in series and which are in closed operative position, if the brake pedal Br and clutch pedal K are not operated. Since the switch $9^2$ opens upon operation of the brake pedal Br and the switch $9^3$ open upon operation of the clutch pedal K, the connection of the anchor disc 9 with the ground $1^2$ through the electric conduit $9^1$ is opened upon either operating the brake pedal Br or the clutch pedal K. The terminals of a switch 24 disposed in series with the magnet coil 23 are arranged on the magnet body 8 and the anchor disc 9, respectively, the switch 24 being disposed in the conduit $9^1$. The switch 24 is closed in a position of the disc 11 settable by the gas pedal 1 and corresponding with the predermined speed and, thereby, closes also the circuit of the magnet coil 23. By this arrangement the anchor disc 9 is pulled to the magnet body 8 and operatively connected with the latter by means of claws 25, which, in this position of the anchor disc 9, are received in complementary recesses 26 of the anchor disc 9. A rotary movement of the control motor 7 is now transmitted to the linkage consisting of the lever 5 and the control rod 4, which linkage can be set, however, beyond the predetermined speed independently from this rotary movement against the force of the spring 13, in case a further acceleration of the vehicle is required.

The switching elements for the production of the feeding currents for the control motor and the operation means are disposed in a servo-device 15. A voltage produced in dependency upon the speed of the vehicle by a generator G, as well as the voltage of the vehicle battery Ba are fed to the servo-device 15. The voltage of the generator G corresponding with the prevailing actual speed of the vehicle, as well as another voltage constituting the settable predetermined speed, which is tapped off the potentiometer 16 having a setting device for the predetermined speed, are switched relative to each other. The difference, formed in a reference member or comparison step 17 between the actual speed and the predetermined speed is fed to an amplifier 18 as the voltage $U_2$, which amplifier 18 feeds the control motor 7. In order to bring about a proportional control, the shaft of the control motor 7 is operatively connected with another potentiometer 19. The voltage $U_1$ tapped off the potentiometer 19 in dependency upon the position of the control motor 7 is likewise fed to the comparison step 17 and to the amplifier 18 and affects the control such, that the difference voltage $U_2$ is adjusted to the magnitude of this voltage $U_1$.

One part of the reference member or comparison step 17 and the amplifier 18 of the principle arrangement shown in FIG. 1 constitute the circuit, designed in accordance with the present invention, for the production of the impulse-like feeding currents for the control motor 7. For the sake of clarification, the known means for forming of the reference voltages $U_1$ and $U^2$, corresponding with the actual and the predetermined speeds and the position of the control motor 7 which reference voltages $U_1$ and $U_2$ can still be stabilized with likewise known means, are disclosed in a simplified manner. The reference voltages $U_1$ and $U_2$ are each applied to the base of two transistors $T_1$ and $T_2$, the collector-emitter-branches of which constitute the resistances of the RC-circuits (condensers $C_1$ and $C_2$) of a known multi-vibrator circuit with the transistors $T_3$ and $T_4$. For simplification of the circuit, complementary transistors $T_1$ and $T_2$ are used for the control of the transistors $T_3$ and $T_4$. The time period, in which, for instance, the transistor $T_3$ is in its blocked state, is thus dependent upon the control of the transistor $T_1$ by the voltage $U_1$. The same is brought about by the voltage $U_2$ by means of the transistor $T_2$ in the transistor $T_4$. If it is assumed that the capacity of the condensors $C_1$ and $C_2$ and the magnitude of the two voltages $U_1$ and $U_2$ is equal, then the blocking time of $T_3$ and $T_4$ is equal. The switching ratio of the multi-vibrator is 1:1. If a difference exists between $U_1$ and $U_2$, the blocking time of the transistors $T_1$ and $T_2$ is different and causes a corresponding change of the switching ratio of the multi-vibrator. The power transistors $T_5$ and $T_6$ follow in known manner the multi-vibrator for amplification, in order to make possible t switching of the currents required for the operation of the control motor.

Series-wound motors with two field windings 20 and 21 can be used for both directions of rotation as the control motor (FIG. 2). It is possible, however, to use also a motor with one field winding, which is reversed as to polarity for an alternate feeding through one of the feeding currents in different directions by means of artificial circuits. Also, a feeding of the field winding by an impulse-like alternating current with the same ratio between positive and negative impulses is possible.

Referring now to FIG. 3 of the drawings, the voltage ratio of the impulse-like feeding currents for the control motor in the two field windings 20 and 21, are shown, whereby always the impulse series correspond with the different directions of rotation of the motor. The sum of the alternating impulse currents is fed to the armature of the control motor and the armature carries, thus, current continuously.

Figure 3B:
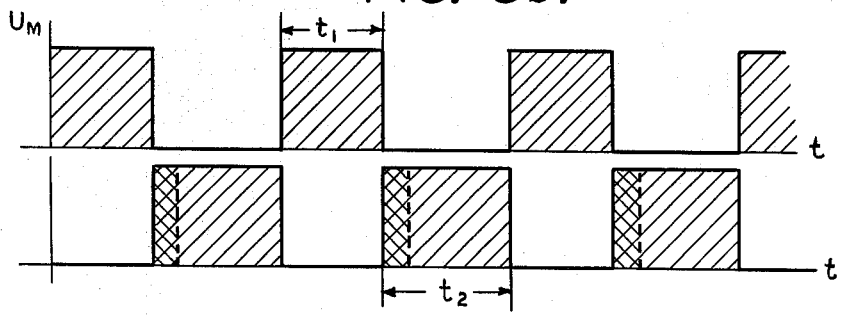
Figure 3C:
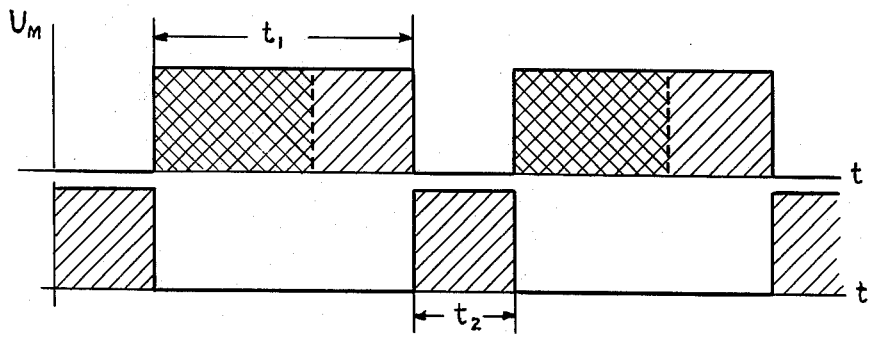

FIG. 3a shows the impulse voltage for the switching ratio 1:1 upon voltage equality of $U_1$ and $U_2$. FIG. 3b shows the switching ratio for the case $U_1 < U_2$, in which case the actual speed is greater than the predetermined speed, and FIG. 3c is an example for the condition that $U_1 > U_2$, when the actual speed is smaller than the predetermined speed. The frequency of the impulse currents becomes smaller with the increasing difference of the speds, since the blocking times of the multi-vibrator circuit are correspondingly increased. In a switching relation of 1:1 (FIG. 3a), the torgues exerted upon the armature by both field windings are of equal size and the motor cannot turn due to its electrical inertia. Due to the inductance of the field windings, the current cannot reach in these field windings its highest magnitude within a relatively short switching time and a low current only flows through the armature during the swtiching ratio 1:1. If, however, the switching ratio assumes a different magnitude (FIGS. 3b or 3c), the motor starts rotation accordingly, since the torque exerted from one field winding is greater than that of the other field winding. It can easily be recognized from the double-hatched reference faces in FIGS. 3b and 3c, that already a small difference of the impulse magnitudes of the two feeding currents, a short timed torque impulse is exerted upon the motor; a dead zone is practically not present and the motor can turn very slowly in small steps. Also, the output of the power transistors $T_5$ and $T_6$ is low, since they operate merely during the switching operation.

Referring now again to the drawings, and in particular to FIGS. 4a, 4b and 4c, which depict diagrammatically the conditions of the voltages of the impulse-like feeding currents, if the impulse periods remain constant, however, the size or value of the voltage amplitude is varied.

In the same manner, as disclosed in FIG. 3, the two series of impulses correspond with the different directions of rotation of the control motor 7. FIG. 4a discloses, similar to FIG. 3a, the impulse voltages for the switching ratio 1:1 upon coincidence of the actual speed with the predetermined speed. The amplitude of both voltages is of equal size. In FIG. 4b, the voltage amplitude surpasses, at an unchanged impulse period, the voltage amplitude of one of the field coils of the control motor 7 and in FIG. 4c the voltage amplitude of the other of the field coils of the control motor 7, depending upon the speed deviation from the predetermined value, in a manner similar to FIGS. 3b and 3c.

The servo-device 15 disposed on the dashboard of the automotive vehicle contains the operating means of the device, which is shown merely as a switching device 22 in FIG. 1. In the zero position, the device is inoperative. Upon switching to the position "Control" (R), the magnet coil 23 in the magnet body 8, as well as a holding contact or switch 24 in the anchor disc 9 are switched on, and the clutch assumes its engaging position, as soon as the gas pedal rod 2 is brought into the position necessary for achieving the predetermined speed. The device regulates then the actual speed to the predetermined speed set by the predetermined-speed adjuster 16. At each operation of the brake Br or of the clutch K, the circuit of the magnet coil 23 of the clutch is opened, the clutch members 8 and 9 will be disengaged, and the gas pedal 1 is returned into the idle position due to the effect of its own return spring 1'.

In the position "Limiting" (B) of the switching device 22, the current for the magnet coil 23 is interrupted and accordingly, the clutch members 8 and 9 remain in nonengaging position. The clutch member 9 is freely rotatable until it engages an abutment (not shown) on the clutch part 8, whereby this abutment is arranged such, that the abutment position is identical with the engagement position of the clutch members 8 and 9. The gas pedal 1 is thus freely movable between the idling position and the abutment position determined by the prevailing position of the control motor. The further movement of the gas pedal 1 beyond this abutment position is still possible by exerting a greater force with simultaneous tensioning of the spring 13 of the disc 11. The reaching of the predetermined value position can be felt by a strong pressure resistance on the gas pedal.

In addition to the predetermined speed adjuster 16 for selecting any predetermined speeds, it is also possible to switch on and control predetermined set speed values, for instance, 50 miles per hour, which correspond with certain predetermined fixed voltage magnitudes of $V_1$ by means of pressure keys.

While we have disclosed several embodiments of the present invention, it is to be understood that these embodiments are given by example only and not in a limiting sense, the scope of the present invention being determined by the objects and the claims.

We claim:
1. A method of controlling and limiting the speed of an automotive vehicle including a gas pedal rod and a throttle operated by the latter by means of a reversible electric motor having two field windings and affecting said gas pedal and said throttle, respectively, the direction of rotation of said control motor being dependent upon the difference between the prevailing actual speed and a settable predetermined speed of said automotive vehicle and upon corresponding reference values, respectively, comprising the steps of feeding of impulse-like currents continuously through both field windings in both directions of rotation to said control motor, whereby the difference between the energizations of said windings varies continuously from a magnitude of zero value at the predetermined speed to a value different from zero proportionally to the variation of the actual speed from the predetermined speed.

2. The method, as set forth in claim 1, wherein said impulse-like currents differ as to their duration.

3. The method, as set forth in claim 1, which includes the step of
feeding said impulse-like currents to said control motor in both directions of rotation in alternating succession.

4. An apparatus for controlling and limiting the speed of an automotive vehicle, comprising
a gas pedal and a throttle adapted to control the gas feed to an engine,
a control motor,
means for controlling the position of said gas pedal and of said throttle by said control motor,
means for rendering responsive the direction of rotation of said control motor to the difference between the actual speed of said automotive vehicle and a settable predetermined speed thereof,
means for transforming said speed values into corresponding voltages to constitute reference voltages,
means for feeding impulse-like currents to said control motor, and
a multi-vibrator controlled by said reference voltages for the production and speed-responsive control of said impulse-like feeding currents.

5. The apparatus, as set forth in claim 4, wherein said multi-vibrator includes RC-circuits,
two transistors operatively connected with said multi-vibrator,
each of said transistors includes a collector-emitter-branch, and
said transistors are operated by said reference voltages, so that in case of voltage equality a symmetrical tapping of said multi-vibrator and in case of voltage inequality an asymmetrical tapping of said multi-vibrator is brought about.

6. The apparatus, as set forth in claim 4, which includes
complementary transistors to be used as control resistors for said multi-vibrator.

7. The apparatus, as set forth in claim 4, which includes
power transistors controlled by said multi-vibrator for the switching of said impulse-like feeding currents for said control motor.

References Cited by the Examiner
UNITED STATES PATENTS

| | | | |
|---|---|---|---|
| 2,911,077 | 11/59 | Carter. | |
| 2,973,051 | 2/61 | Teetor | 180—82.1 |
| 3,070,185 | 12/62 | Fales | 180—82.1 |
| 3,116,807 | 1/64 | Wilson | 180—82.1 |
| 3,122,678 | 2/64 | Marlot | 317—5 |
| 3,153,746 | 10/64 | Atkinson | 317—5 |

OTHER REFERENCES

Article: "Transistors: a New Class of Relays," in "Control Engineering," vol. 3, December 1956, pages 70–76.

BENJAMIN HERSH, *Primary Examiner.*

A. HARRY LEVY, *Examiner.*